(12) United States Patent
Poon et al.

(10) Patent No.: US 6,597,587 B1
(45) Date of Patent: Jul. 22, 2003

(54) CURRENT DRIVEN SYNCHRONOUS RECTIFIER WITH ENERGY RECOVERY USING HYSTERISIS DRIVER

(75) Inventors: Frankie Ngai Kit Poon, Hong Kong (CN); Joe Chui Pong Liu, Hong Kong (CN); Man Hay Pong, Hong Kong (CN)

(73) Assignee: The University of Hong Kong (CN)

( * ) Notice: Subject to any disclaimer, the term of this patent is extended or adjusted under 35 U.S.C. 154(b) by 0 days.

(21) Appl. No.: 10/115,492

(22) Filed: Apr. 2, 2002

(51) Int. Cl.[7] .................... H02M 3/335; H02M 7/06
(52) U.S. Cl. ................ 363/21.06; 363/21.14; 363/125; 363/127
(58) Field of Search .................. 363/21.06, 21.14, 363/125, 127, 84

(56) References Cited

U.S. PATENT DOCUMENTS

| | | | |
|---|---|---|---|
| 4,922,404 A | 5/1990 | Ludwig et al. | 363/89 |
| 5,097,403 A | 3/1992 | Smith | 363/127 |
| 5,126,615 A | 6/1992 | Takeuchi et al. | 310/330 |
| 5,126,651 A | 6/1992 | Gauen | 323/222 |
| 5,179,512 A | 1/1993 | Fisher et al. | 363/127 |
| 5,303,138 A | 4/1994 | Rozman | 363/21 |
| 5,439,644 A * | 8/1995 | Gramkow et al. | 422/62 |
| 5,457,624 A * | 10/1995 | Hastings | 363/127 |
| 5,956,245 A * | 9/1999 | Rozman | 363/89 |
| 6,038,154 A * | 3/2000 | Boylan et al. | 363/127 |
| 6,101,104 A * | 8/2000 | Eng | 363/21.06 |
| 6,134,131 A | 10/2000 | Poon et al. | 363/127 |

* cited by examiner

Primary Examiner—Bao Q. Vu
(74) Attorney, Agent, or Firm—Pennie & Edmonds LLP

(57) ABSTRACT

A synchronous rectifier using current driven approach is disclosed which can replace diode rectifier in most of the power converter topologies to enable low rectification loss. The present invention comprises a low loss switch and essentially a transformer with at lease one current sensing winding, windings for current sense energy recovery and one driving winding connected to a hysterisis driver which provides driving signal and power for the synchronous rectifier. A hystersis driver is introduced which can reduce the noise interference to the driving signal, increase the operating frequency range, eliminate the saturation problem of the current sensing transformer and hence provide more flexibility to the transformer design. This synchronous rectifier is self-driven and the driving signal is independent of the input voltage of the converter which enhances its application to wide input range converter. Current sense energy recovery enables power converters to operate at high efficiency and high frequency.

12 Claims, 10 Drawing Sheets

CURRENT DRIVEN SYNCHRONOUS RECTIFIER WITH ENERGY RECOVERY USING HYSTERISIS DRIVER

FIELD OF THE INVENTION

This invention relates to the field of power converter, in particular to the field of synchronous rectifier for high efficiency converters.

BACKGROUND OF THE INVENTION

Power converter designs based on diode rectifiers are limited by the conduction loss of diode rectifiers due to their forward voltage drop, typically 0.7V for silicon diode, during forward conduction. This loss is significant when the rectified output voltage is low and comparable to the forward voltage drop of the diode rectifier. For example, the supply voltage for logic circuits nowadays and microprocessors can be as low as 2.2V or even lower in the future. The output diode rectifiers used in the converters for such applications typically consume one-third of the output power.

A known way to improve the rectification efficiency is to replace the diode rectifier by a synchronous rectifier using an active switch with low conduction loss like MOSFET. A synchronous rectifier has a lower forward voltage drop than a diode due to the much lower drop in a transistor. However, as an active switch a synchronous rectifier needs a driving signal in to turn it on at the appropriate times. In addition, the loss and performance of the active switch is sensitive to the driving signal amplitude and waveform. Consequently, the driving method becomes an important issue in synchronous rectifier design.

A typical synchronous rectifier makes use of a voltage signal derived from the main transformer windings to drive a MOSFET to ensure that the MOSFET turns on and off in synchronism with the alternating voltage signal on the transformer. However this driving method is not suitable for certain converter topologies. An example is the forward switching regulator using resonant reset. In this case the synchronous rectifier cannot obtain a driving signal during the entire conduction period because the driving voltage collapses with resetting of the main transformer. In the presence of the leakage inductance of the main transformer, no driving signal can be obtained during the commutation period. During this period the body diode instead of the conduction channel of the MOSFETs turns on for current conduction. This increases the losses in the synchronous rectifier especially at high frequency and high current because the forward voltage drop of the body diode is even higher than that of a conventional diode rectifier and with a further increase in the commutation time with the higher output current. Another example of a converter topology that is not driven well by transformer primary/secondary windings is the use of synchronous rectifier in low frequency AC rectification. The slow rising edge of sinusoidal driving voltage, e.g., 50 Hz or 60 Hz main transformer driven by a sinusoidal voltage, cannot efficiently drive the synchronous rectifier into its on state during the conduction period. These limitations impose restrictions on the input voltage range, the choice of topologies of the converter and particular applications.

Considerable effort has been expended in tackling the problem of efficiently driving a synchronous rectifier. U.S. Pat. No. 5,179,512, issued to Fisher et al. on Jan. 12, 1993, disclosed a gate drive circuit for synchronous rectifier. However, this gate drive can only work in resonant converters. U.S. Pat. Nos. 5,126,651 and 5,457,624, Kim R. Gauen (issued on Jun. 30, 1992) and Roy A. Hastings (issued on Oct. 10, 1995) respectively disclose drive circuits for synchronous rectifiers. These drive circuits can only be applied to non-isolated buck converter. Similarly, U.S. Pat. No. 5,303,138, issued to Allen F. Rozman on Apr. 12, 1994, disclosed gate drive circuits but without solving the problem of expanding the limited input voltage range. U.S. Pat. No. 5,097,403, issued to David A. Smith on Mar. 17, 1992, disclosed current sense rectifier and electronic circuits to detect current that are only applicable to MOSFET with current sense facility. Notably, U.S. Pat. No. 4,922,404, issued to Ludwig et al. on May 1, 1990, discusses the complexity of using a microprocessor to drive synchronous rectifiers. U.S. Pat. No. 6,134,131, issued to Poon et al. on Oct. 17, 2000, disclosed a current transformer for sensing the current and providing a suitable gate drive for the synchronous rectifier with current sense energy recovery. Although this design is superior in many respects, it is limited by the requirement that the current transformer should not experience saturation due to large operating duty cycle or low operating frequency. Moreover, noise may further interferes with the driving signal.

SUMMARY OF THE INVENTION

A method and system for improving synchronous rectifier performance with the aid of an additional hystersis driver is disclosed. This driver reduces noise interference with the driving signal, increases the operating frequency range, enhances the driving capabilities even with an otherwise too low a magnetizing inductance to sink the driving current to the gate of the MOSFET. The disclosed method and system overcomes problems due to saturation of the current sensing transformer in addition to producing a low magnetizing inductance resulting in greater flexibility in transformer design.

The disclosed method and ssytem encompasses efficient rectification of current in a selected branch of an electronic circuit. It makes use of a low loss MOSFET and with associated circuitry to realize the equivalent of a low loss diode with energy recovered from the current sensing means to ensure high efficiency.

In particular, the disclosed embodiments have a low loss active switching device with parallel diode such as a MOSFET, a plurality of windings, two diodes which are connected to a voltage source such as the output voltage or a zener diode. A first winding of the transformer is coupled in series with the diode simulating switching device. A second winding of the transformer is coupled to a hysterisis driver with its output coupled to the control terminal of the switching device. A third and a fourth winding of the transformer each with a series diode are connected to a voltage source.

Current flows through the first winding and a series MOSFET. A voltage is induced on the second winding and provides a driving signal for this MOSFET. The second winding is arranged to provide a positive voltage signal to the input of the hysterisis driver so that the MOSFET is driven ON for as long as possible while the current through the first winding flows in the forward direction.

A main current flowing through the first winding and the MOSFET produces a voltage on the second winding that, in turn, turns the MOSFET ON. However, this voltage may not be sustained throughout the period during which the current flowing through the primary winding is flowing in the forward direction. This is because magnetizing current increases with time and the voltage collapses when the magnetizing current exceeds the main current in the first winding. Therefore, increasing the time for which the MOSFET is ON improves the efficiency.

Use of a hysterisis driver is disclosed as one strategy to turn ON the MOSFET for a longer duration. The hysterisis driver overcomes this limitation because it has preset upper and lower thresholds. It turns on the MOSFET when the voltage induced on the second winding exceeds the upper threshold. Moreover, with the lower threshold set sufficiently low, the turn on signal is maintained as long as the main current remains positive. In other words even after the voltage on the second winding has collapsed the driving signal for turning the MOSFET ON is maintained. This ensures availability of a sufficient driving signal even when the current sensing transformer runs into saturation. Hence, the use of current driven technique results in the synchronous rectifier operating like a low loss active diode with the turning ON and OFF of the active switch independently of the input voltage.

The third winding limits the voltage generated and provides energy recovery. Voltage applied to the input of the hysterisis driver as well as the control terminal of the switching device must be limited to avoid damage to the switching device. The third winding of the transformer couples excessive energy to a voltage source and provides voltage clamping. The driving voltage amplitude is controlled by the turn ratio of the second to the third windings and the voltage source. A diode placed in series with the third winding ensures that voltage clamping is effective while the MOSFET is turned ON. This arrangement makes the driving signal independent of input voltage range and waveforms. Excessive energy in the first winding is transferred to the voltage source such as the DC output voltage of the power converter with the recovered current sensing energy becoming part of the output power.

The fourth winding provides magnetic reset. A reset mechanism is needed to allow an opposite voltage in the windings in the turn-off period after the transformer is energized during the turn-on period. The fourth winding provides a reset path whereby magnetizing energy stored in the transformer is released through a series connected rectifier to a voltage source. The phase of this fourth winding should be opposite to that of the third winding such that one winding facilitates the turn-on period while the other facilitates the turn-off or reset period. This arrangement allows the magnetizing energy to be recovered and reused.

Accordingly, the disclosed method and system provide an improved self-driven synchronous rectifier circuit with current sensing and suitable for wide input voltage and/or frequency ranges. In particular, sufficient driving signal is provided during current commutation along with energy recovery from current sensing. Moreover, the disclosed method and system have application to both isolating and non-isolating converters.

These and other advantages of the present invention will become apparent to those having ordinary skill in the art from the following detailed description of the invention and from the accompanying drawings.

DETAILED DESCRIPTION OF THE INVENTION

Figure 1:
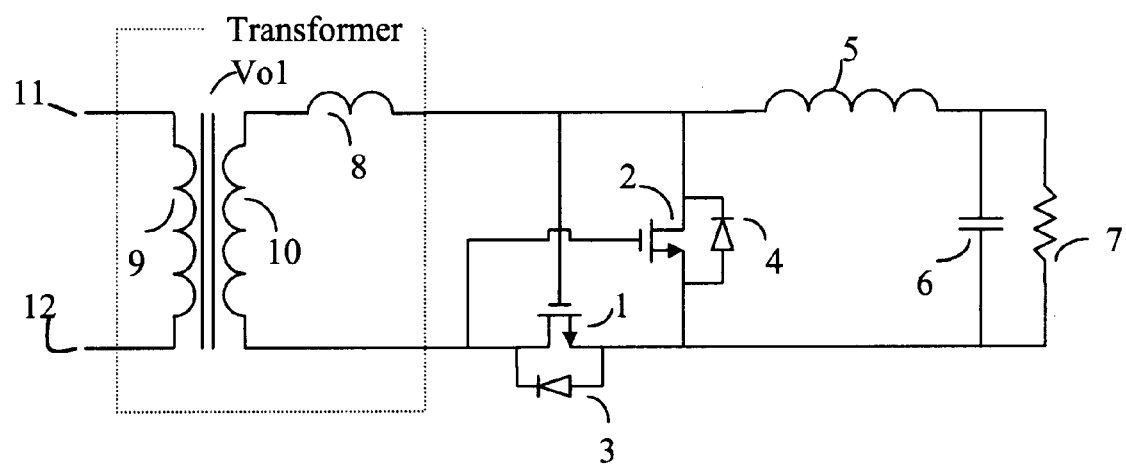
FIG. 1 is a schematic diagram of self-synchronized rectifiers driven by the output voltage of a forward converter.

The features of the present invention may be better understood by means of the following description of FIG. 1 that shows a typical configuration for driving two synchronous rectifiers on the output stage of a typical forward type converter. The configuration includes a main transformer with its primary winding 9, secondary-winding 10 and output leakage inductance 8. The synchronous rectifiers are MOSFETs 1 and 2, and diodes 3 and 4 are the inherent body diodes of MOSFET 1 and 2 respectively. Inductor 5 and output capacitor 6 put together an output filtering circuit. Resistor 7 represents the equivalent load.

Upon application of an alternating voltage to terminals 11 and 12 of primary winding 9, an alternating voltage is induced in secondary-winding 10. When the voltage across secondary-winding 10 becomes positive, it drives a current through equivalent leakage inductor 8. At this time continuous current flows through output inductor 5 and diode 4. As current through equivalent leakage inductor 8 rises from zero towards the current level of inductor 5, diode 3 conducts simultaneously with diode 4. Since the gate terminals of MOSFETs 1 and 2 are connected to the drain terminals of each other, both active switches 1 and 2 are turned off with current flowing through their body diodes in this period. Body diode of MOSFET has a high (with high dissipation) forward voltage of 0.7V that is higher than that of a MOSFET that has been switched ON. When current through diode 3 reaches the current level of inductor 5 diode 4 turns off and MOSFET 1 is allowed to turn on. Only at this time can current flow through the low-loss MOSFET 1 instead of its body diode.

When the input alternating voltage goes from positive to negative, the voltage across secondary-winding 10 becomes negative. However, the current flowing through equivalent output leakage inductance 8 cannot drop to zero instantly. Instead there is a period in which simultaneous conduction of MOSFET body diodes 3 and 4 occurs. In this period MOSFETs 1 and 2 are turned off and current flows though the high loss body diodes until current through leakage inductance 8 falls to zero and MOSFET 2 comes into full conduction.

The synchronous rectifier so described has three major drawbacks. Firstly simultaneous conduction periods so described reduce converter efficiency. This reduction in efficiency is further aggravated when converter switching frequency and output current increase and/or the simultaneous conduction period becomes a significant portion of the switching period. Secondly, the driving signal for the two MOSFETs is dependent on the voltage and waveform across the secondary-winding of the main transformer. When the supply voltage on the primary side varies over a wide range, the secondary voltage may exceed the gate voltage limit of the MOSFET, or it may be too low to turn the MOSFETs fully on. Thirdly, a special optimum reset mechanism of the main transformer is required to ensure a complete driving signal for the synchronous rectifier or the driving voltage will collapse after the main transformer has been reset and further increase the body diode conduction period and hence the loss.

Figure 2:
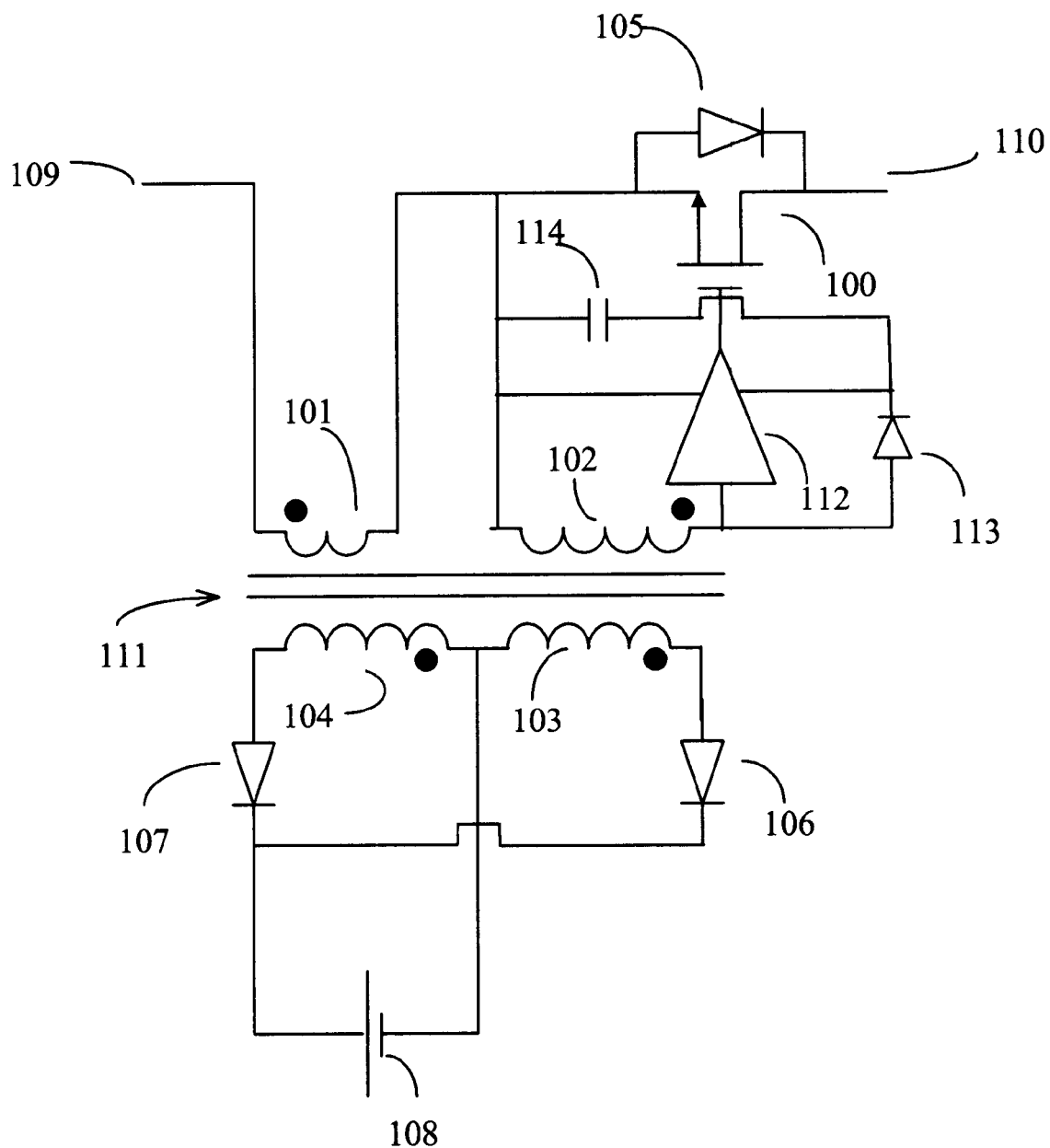
FIG. 2 is a circuit of a basic embodiment of the present invention.

FIG. 2 illustrates an exemplary circuit diagram depicting a MOSFET 100 having parallel diode 105 with its anode connected to the MOSFET source terminal and cathode connected to the MOSFET drain terminal. Although not intended to be a limitation, parallel diode 105, in general, is the body diode of MOSFET 100. The circuit diagram further depicts transformer 111 with four windings 101–104. Winding 101 has one end coupled to a terminal 109 and the other end coupled to the source terminal of MOSFET 100. Winding 102 has one end coupled to the input of hysterisis buffer 112 and the other end to the source terminal of MOSFET 100. The output of hysterisis buffer 112 is coupled to the gate of MOSFET 100 to provide driving signal. Diode 113 and capacitor 114 form a rectifying circuit to obtain power from winding 102 and provide a DC supply voltage for the hysterisis buffer 112 with voltage approximately equals to the positive amplitude of the voltage across winding 102.

In FIG. 2, winding 103 has one end coupled to the anode of a diode 106, while the other end couples to the negative terminal of a voltage source 108. Winding 104 has one end coupled to the anode of a diode 107, while the other end couples to the negative terminal of voltage source 108. Diodes 106 and 107 have their cathodes connected together and to the positive terminal of voltage source 108. Terminal 110 is coupled to the drain terminal of MOSFET 100.

Figure 3A:
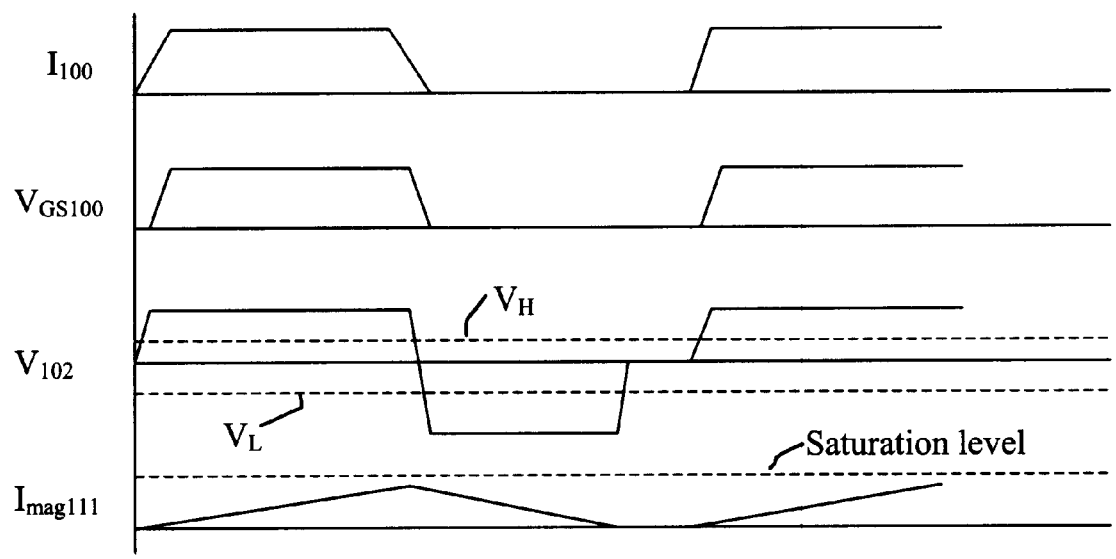
FIGS. 3A–3C are timing diagrams of operating voltage and current of the basic embodiment.

Theory of operation of the first basic embodiment is described. The basic embodiment resembles a diode with anode at terminal 109 and cathode at terminal 110. When voltage at terminal 109 is higher than that at terminal 110 by a magnitude of the forward voltage drop of diode 105, current will start to flow from terminal 109 to terminal 110 through winding 101 and body diode 105. FIG. 3A shows the operating waveforms of $I_{100}$ the current flowing through winding 101, $V_{GS100}$ the output of the hysterisis buffer 112, V102 the input of the hysterisis buffer 112 and $I_{mag111}$ the magnetizing current of the transformer 111 in this embodiment. As current flows through the current sensing winding 101, a positive voltage Vg_on will be induced at winding 102. Winding 102 is arranged so that a positive voltage is induced across the input of hysterisis buffer 112 and source terminal of MOSFET 100. The upper threshold $V_H$ of hysterisis buffer 112 is set below voltage Vg_on so that the output of the hysterisis buffer equals Vg_on for driving the MOSFET ON and allow current flow through its low resistance channel rather than the body diode 105. The time interval between current starting to flow through the body diode and the turn on edge of the MOSFET is inversely proportional to product of the magnitude of the operating current and the current gain of the hysterisis buffer, the gate charge required to turn on the MOSFET and the inherent buffer turn on delay. The driving voltage Vg_on is determined by the winding ratio of windings 102 and 103, the magnitude of the voltage source 108 and coupling coefficient of transformer 111. Winding 103 is arranged such that current induced in this winding will deliver current into voltage source 108 and the magnitude of this current is determined by the ratio of windings 101 and 103. Voltage source 108 acts as a voltage clamping facility to clamp the drain source voltage of MOSFET 100. This mechanism can also recover energy back to voltage source 108.

Turn off operation of the synchronous rectifier is described with reference to FIG. 3A. When current flowing from terminal 109 to terminal 110 falls to zero, transformer 111 resets itself and generates a negative voltage Vg_off across winding 102. With $V_L$, the lower threshold of the hysterisis buffer set higher than Vg_off, the output of the hysterisis buffer falls to zero or Vg off, depending on the design of the hysterisis buffer, and drives the MOSFET 100 OFF. The turn off voltage $Vg_{13}$ off is determined by the winding ratio of windings 102 and 104, the magnitude of voltage source 108 and coupling coefficient of transformer 111. Winding 104 is arranged such that current is delivered to voltage source 108 in the reset process with the magnitude of the current is determined by winding 104 and the magnetic properties of transformer 111. This charging current actually recovers magnetizing energy stored in transformer 111 and delivers it to voltage source 108.

Voltage source 108 has not been specifically identified but in fact it can be any voltage source with a constant voltage within a converter system. One obvious voltage source is the output of a converter since it allows energy recovered from the current sense winding and energy stored in transformer 111 to be directly utilized by the output load.

Losses associated with diodes D106 and D107 are low because the current handled by these two diodes are scaled down by the turn ratio of winding 103 to winding 101 and winding 104 to winding 101 respectively. However, the losses can be further reduced by using other low loss switches such as MOSFET with suitable drive.

The hysterisis buffer 112 not only reduces the noise problem but also makes the current transformer design flexible. In adverse conditions, such as long duty cycle or high temperature, transformer 111 may be driven to saturation. Driving voltage at winding 102 collapses as a consequence but the normal gate drive signal is not affected in the presence of the hysterisis buffer.

Figure 3B:
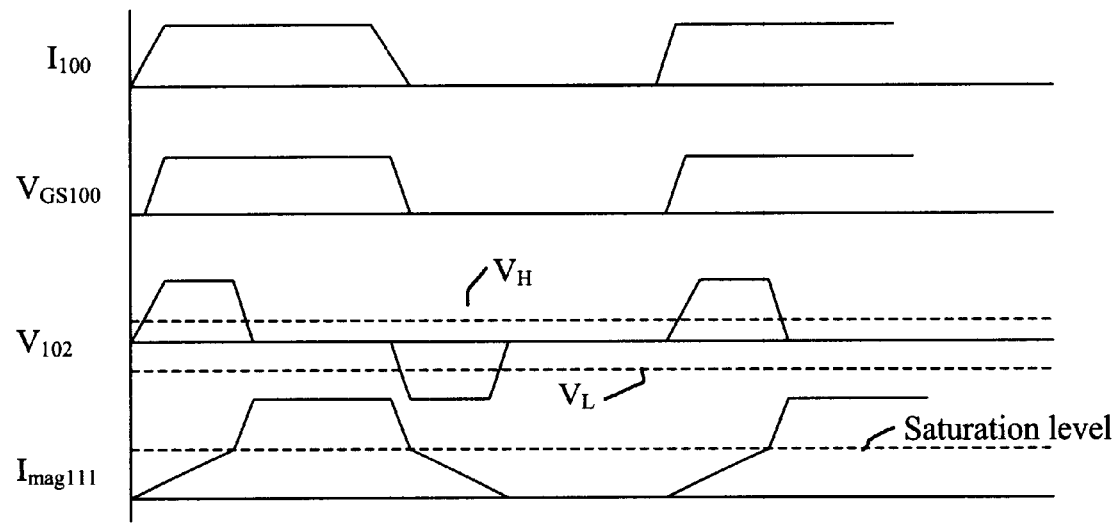

FIG. 3B shows the operating waveforms when the transformer is driven beyond saturation. $I_{100}$ is the current through winding 101, $V_{GS100}$ is the output of the hysterisis buffer 112, V102 is the input of the hysterisis buffer 112 and $I_{mag111}$ is the magnetizing current of the transformer 111. With transformer 111 driven to saturation, the drive signal across winding 102 or the input to the hysterisis buffer 112 falls to zero. Since the output of the hysterisis buffer 112 changes only when its input falls below the lower threshold $V_L$, the gate drive signal amplitude is maintained if $V_L$ is set to a negative value. When the current flowing through the current sense winding 101 falls sufficiently to reduce the magnetizing current of transformer 111 below the saturation level, the drive signal across 102 becomes negative. The is drive signal triggers the hysterisis buffer 112 to turn off the synchronous rectifier in response to reaching the lower threshold $V_L$. It can be seen that a complete gate drive waveform for MOSFET 100 remains intact.

Figure 3C:
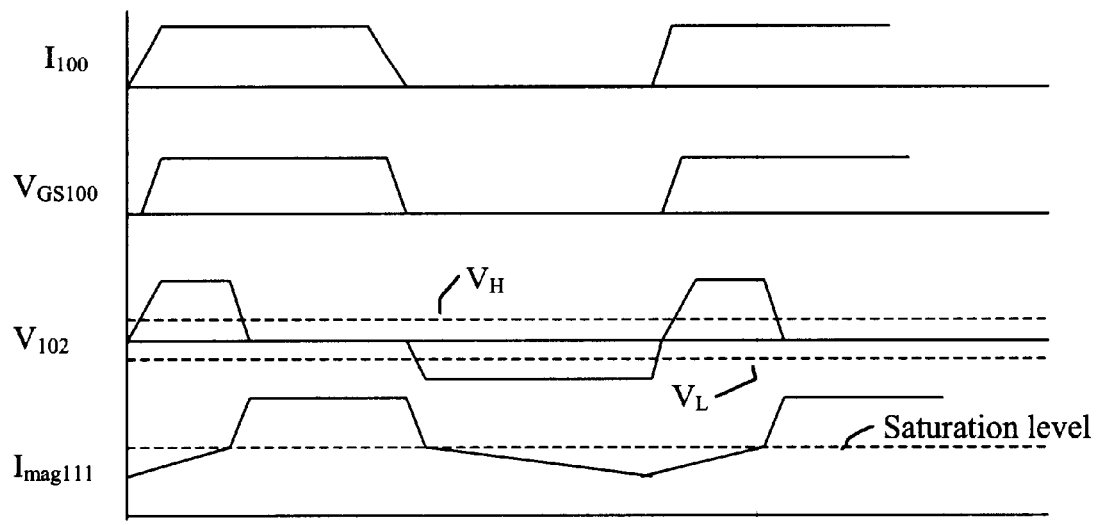

FIG. 3C shows another possible condition of transformer 111. If the operating duty cycle is long so that the reset period is not enough to reset transformer 111 by the reset voltage of transformer 111, a high DC component of the magnetizing current sustains. The voltage across winding 102 or the input of the hysterisis 112 will collapse if the magnetizing current is higher than the reflected driving current at this winding and transformer 111 is driven to saturation. Buffer 112 maintains normal gate drive as long as its input does not fall below $V_L$.

The operating frequency of the present invention can be as low as AC line frequency range or even lower because the present invention eliminates the need to consider the saturation problem. In other words, the size of transformer can be greatly reduced.

Advantageously, no timing circuit or control circuit is needed to generate the necessary synchronous driving signal for MOSFET 100.

Figure 4:
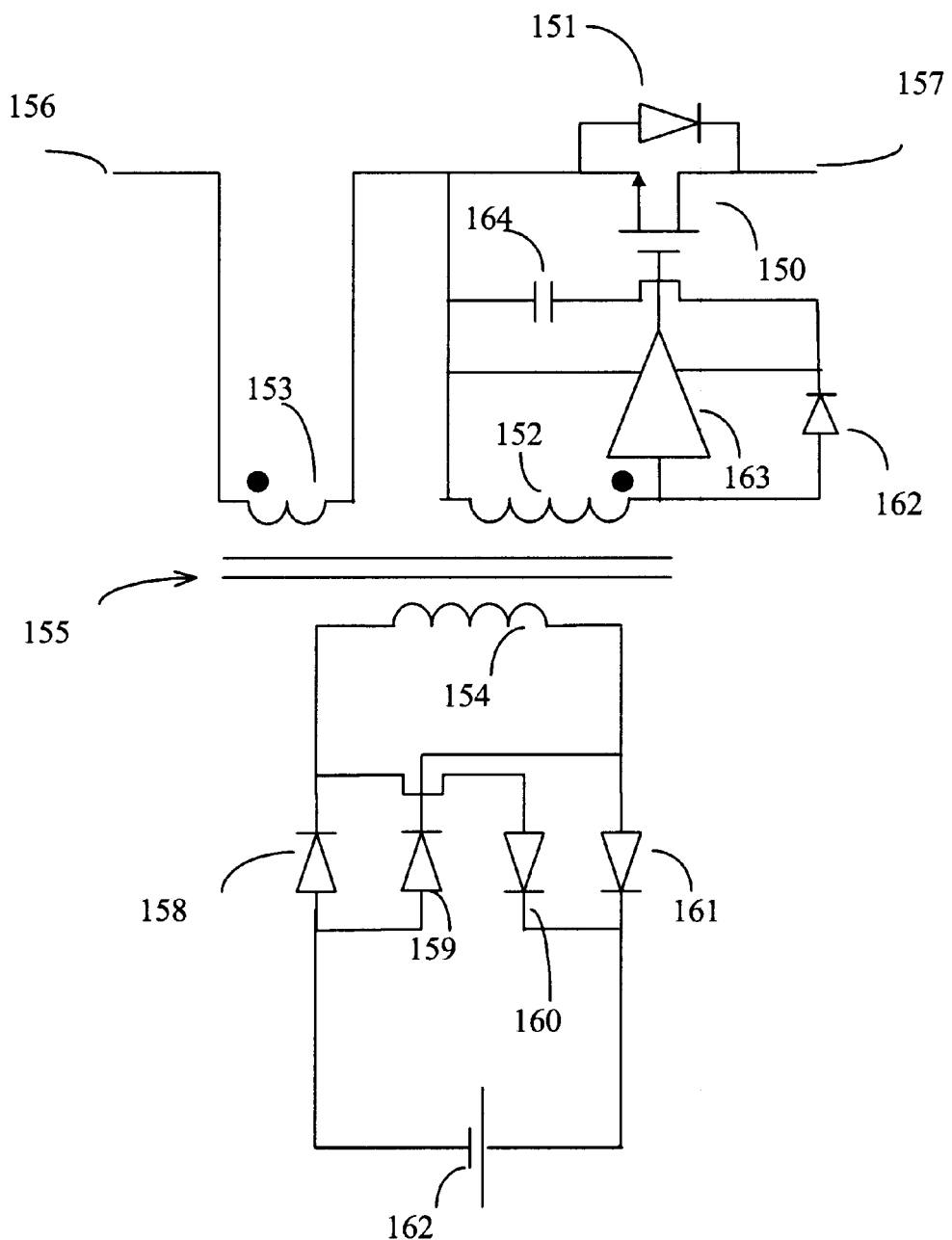
FIG. 4 is a basic embodiment with less transformer windings and more rectifying diodes.

FIG. 4 shows another circuit diagram for yet another exemplary embodiment. It differs from FIG. 2 in the usage of four diodes for rectification to a voltage source. The circuit illustrated in FIG. 4 depicts a MOSFET 150 as the main switch having a parallel diode 151 with its anode connected to the MOSFET source terminal and cathode connected to the MOSFET drain terminal. Although not intended to be a limitation, parallel diode 151, in general, is the body diode of MOSFET 150. A terminal 157 is coupled the drain terminal of the MOSFET. The circuit diagram further depicts a transformer 155 with three windings 152–154. Winding 153 has one end coupled to a terminal 156 and the other end coupled to the source of MOSFET 150. Winding 152 has one end coupled to the input of hysterisis buffer 163 and the other end to the source terminal of MOSFET 150. The output of hysterisis buffer 163 is coupled to the gate of MOSFET 150 to provide driving signal. Winding 154 has one end coupled to the anode of diode 161 and the cathode of diode 159, while the other end couples to the anode of diode 160 and the cathode of diode 158. The anodes of diodes 158 and 159 are tied together and coupled to the negative terminal of voltage source 162. The cathodes of diodes 160 and 161 are tied together and coupled to the positive terminal of voltage source 162.

Operationally, the circuit functions as a diode with anode at terminal 156 and cathode at terminal 157. When voltage at terminal 156 is higher than that at terminal 157 by a magnitude of the forward voltage drop of diode 151, current flows from terminal 156 to terminal 157 through winding 153 and body diode 151. This current flow through the current sensing winding 153 results in a positive voltage Vg being induced at winding 152. Winding 152 is arranged so that a positive voltage is induced across the input of hysterisis buffer 163 and source terminal of MOSFET 150. As the voltage induced at the hysterisis buffer 163 input exceeds the upper threshold $V_H$ of hysterisis buffer 163, the output of the hysterisis buffer becomes sufficiently positive to drive MOSFET 150 ON and shunt current through its low resistance channel rather than body diode 151. The time interval between current starting to flow through the body diode and the turn on edge of the MOSFET 150 is inversely proportional to product of the magnitude of the operating current and the current gain of the hysterisis buffer, the gate charge required to turn on the MOSFET 150 and the inherent buffer turn on delay. The driving voltage Vg_on is determined by the winding ratio of windings 152 and 154, the magnitude of the voltage source 162 and coupling coefficient of transformer 155. Winding 154 delivers current to voltage source 162 and the magnitude of this current is determined by the ratio of windings 154 and 153. Voltage source 162 acts as a voltage clamping facility to clamp the drain source voltage of MOSFET 150. This mechanism can also recover energy back to voltage source 162.

Turn OFF operation of the synchronous rectifier is described next. When current flowing from terminal 156 to terminal 157 falls to zero, transformer 155 resets and generate a negative voltage $Vg_{13}$ off across winding 152. With $V_L$, the lower threshold of the hysterisis buffer 163 set higher than Vg off, the output of the hysterisis buffer becomes zero or Vg_off, depending on the design of the hysterisis buffer, and drives the MOSFET 150 OFF. The Vg_off is determined by the winding ratio of 152 and 154, the magnitude of voltage source 162 and coupling coefficient of transformer 155. Winding 154 delivers current to voltage source 162 in the reset process and the magnitude of the current is determined by winding 154 and the magnetic properties of transformer 155. This charging current recovers energy stored in transformer 155 and the gate charge of MOSFET 150 to voltage source 162.

Voltage source 162 can be any voltage source with a constant voltage inside a converter system. One obvious choice is the output of a converter. This allows energy recovered from the current sense winding and the energy store in transformer 162 to be directly utilized by output loads.

Losses associated the four diodes D158, D159, D160 and D161 are low because (1) the current handled by these two diodes are scaled down by the turn ratio of winding 154 to winding 153; and (2) the losses can further be reduced by replacing these diodes by low loss switches such as MOSFET with suitable drive.

As discussed previously, the saturation problem of the transformer 155 does not affect the gate drive and hence the operating frequency can be as low as AC line frequency range or even lower without requiring a large sized core for transformer 155. In other words, the size of transformer can be reduced greatly for high frequency operation. Furthermore, no timing circuit or control circuit is needed to generate the synchronous driving signal for MOSFET 150.

Figure 5:
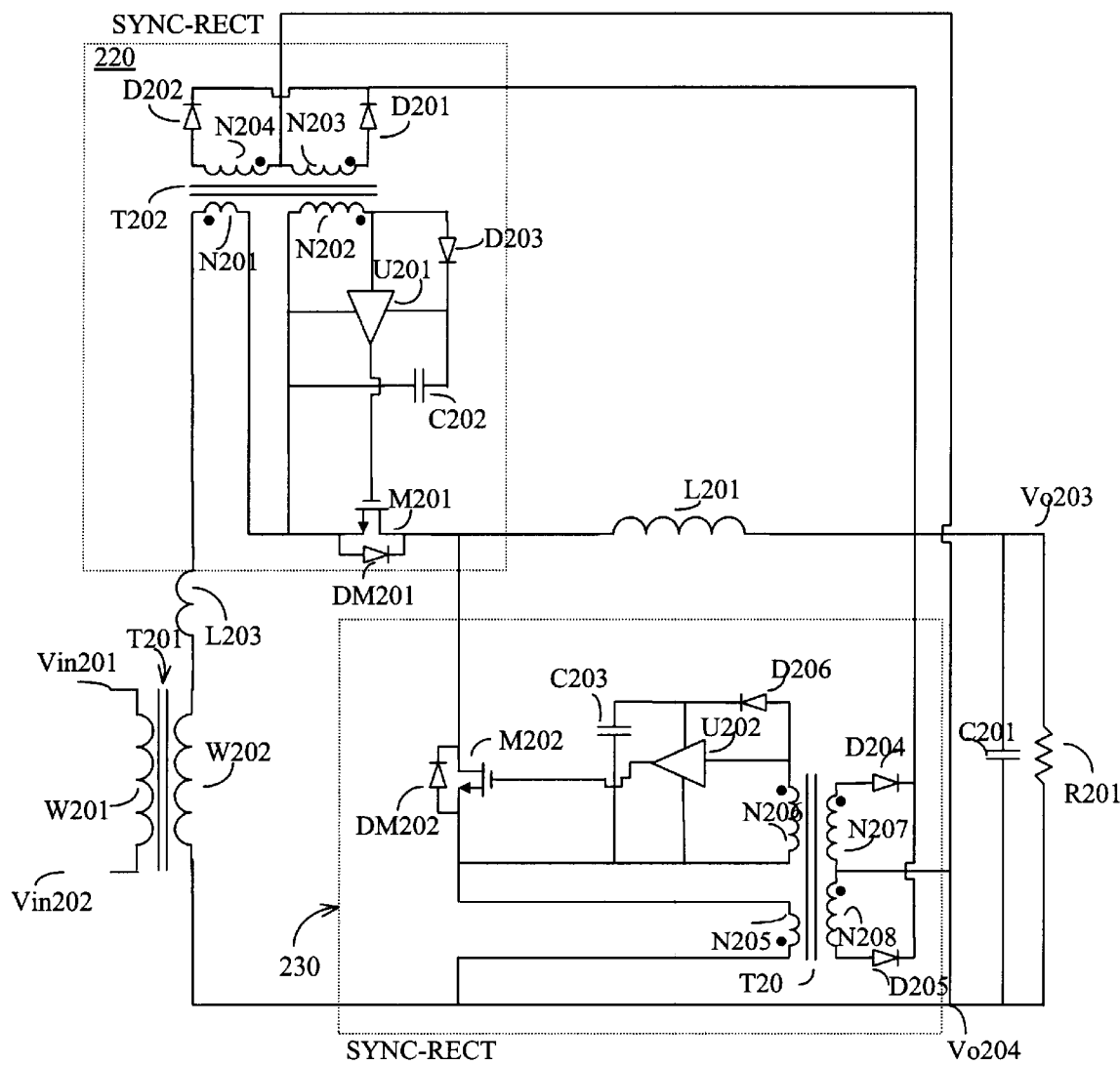
FIG. 5 is a first practical implementation of the present invention.

FIG. 5 shows an embodiment of the invention deployed in an isolated forward converter with half wave rectification. It shows transformer T201, the main output transformer of a forward converter that includes primary winding W201, secondary-winding W202 and equivalent leakage inductance L203. One terminal of the secondary-winding is coupled to synchronous rectifier unit 220. Synchronous rectifier unit 220 comprises all components described in the previously described circuit diagrams of FIGS. 2 or 4. Although not depicted explicitly, synchronous rectifier units 220 and 230 may have the configuration illustrated in FIGS. 2 and/or 4. A similar synchronous rectifier unit 230 is coupled to another terminal of secondary-winding W202 and synchronous rectifier unit 220. Filter inductor L201 is coupled to synchronous rectifiers 220 and 230. An output filter capacitor C201 is coupled to filter L201. Output terminals Vo203 and Vo204 are coupled to capacitor C201 that is, in turn, connected to load resistor R201. Terminals for connection to a voltage source in the two synchronous rectifier units are connected to output terminals Vo203 and Vo204 respectively.

The operation during a positive cycle is described next. An AC voltage is applied to primary winding W201 and a corresponding AC voltage is induced across secondary-winding W202. Only half cycle of the AC output voltage will be rectified and filtered to provide DC output. When secondary-winding W202 transitions into a positive cycle from its negative cycle, current starts to flow through winding N201 and body diode DM201. Current through winding N201 induces a voltage in winding N202. This voltage drives the input of the hysterisis buffer U201. Hysterisis buffer U201 is connected to the gate terminal of MOSFET M201 to drive M201 ON. D203 and C202 rectify the AC voltage on N202 to a DC voltage to supply the buffer U201. With a continuous current flowing through inductor L201, current flowing through the switch M201 ramps up while current flowing through switch M202 ramps down correspondingly. The rate of change of current is determined by output leakage inductance L203 of transformer T201. Since both MOSFETs M201 and M202 are conducting, the secondary terminal voltage of transformer T201 is essentially zero, as most of the voltage drops across output leakage inductor L203. Nevertheless, both MOSFETs are turned ON by the current through them and kept to minimum voltage drop with minimal dissipation. This solves the problem of simultaneous conduction through body diodes of MOSFETs in the prior art circuit configuration. After current through M201 has ramped up to the value of current level in inductor L201, current flowing through MOSFET M202 and winding N205 falls to zero. With no current through winding N205, a negative voltage is produced across N206 that, in turn, drives the hysterisis buffer U202 to turn MOSFET M202 OFF. During rest of the positive cycle current flows through synchronous rectifier unit 220 until voltage at winding W202 changes.

The operation of this implementation during a negative cycle is described next. When secondary-winding W202 exhibits a negative cycle from its positive cycle, voltage applied across the primary winding W202 is reversed. Current through MOSFET M201 decreases. However, leakage inductance L203 of the transformer T201 keeps its current in the same direction for a finite time. As a result, both MOSFETs will have current flowing while that through M201 is ramping down and that through M202 is ramping up. As both switches are turned on, voltage across the transformer secondary terminals is approximately zero. This mechanism keeps the two MOSFETs in ON state and with minimum voltage drops and losses solving the problem of losses due to simultaneous conduction through MOSFET body diodes. This transition period ends with current flowing in M202 ramping up to the current level of inductor L201. Current in M201 falls to zero and then is turned off. Current continues to flow through M202 during rest of the negative cycle.

When the voltage across the primary winding is zero during one switching cycle, synchronous rectifier unit 203 can still drive MOSFET M202 on and take advantage of its low loss characteristics. This is because the present invention is current driven. As long as current is continuous through inductor L201 transistor M202 will be kept on. This is in contrast to prior art technology that cannot provide proper voltage drive under this condition, as no voltage is induced on secondary-winding and no driving signal can be provided to the MOSFET.

This embodiment rectifies positive cycles and produce a steady DC output voltage, it is apparent to those skilled in the art that if the MOSFETs are connected in reverse manner, negative pulse train will be form and hence resulting in negative output voltage.

Operation of the described embodiment is independent of input AC voltage on the transformer primary side because it is current driven and not dependent on input voltage. This allows power converter to operate with high efficiency over a wide input voltage range—a significant advantage over prior art technology.

Figure 6:
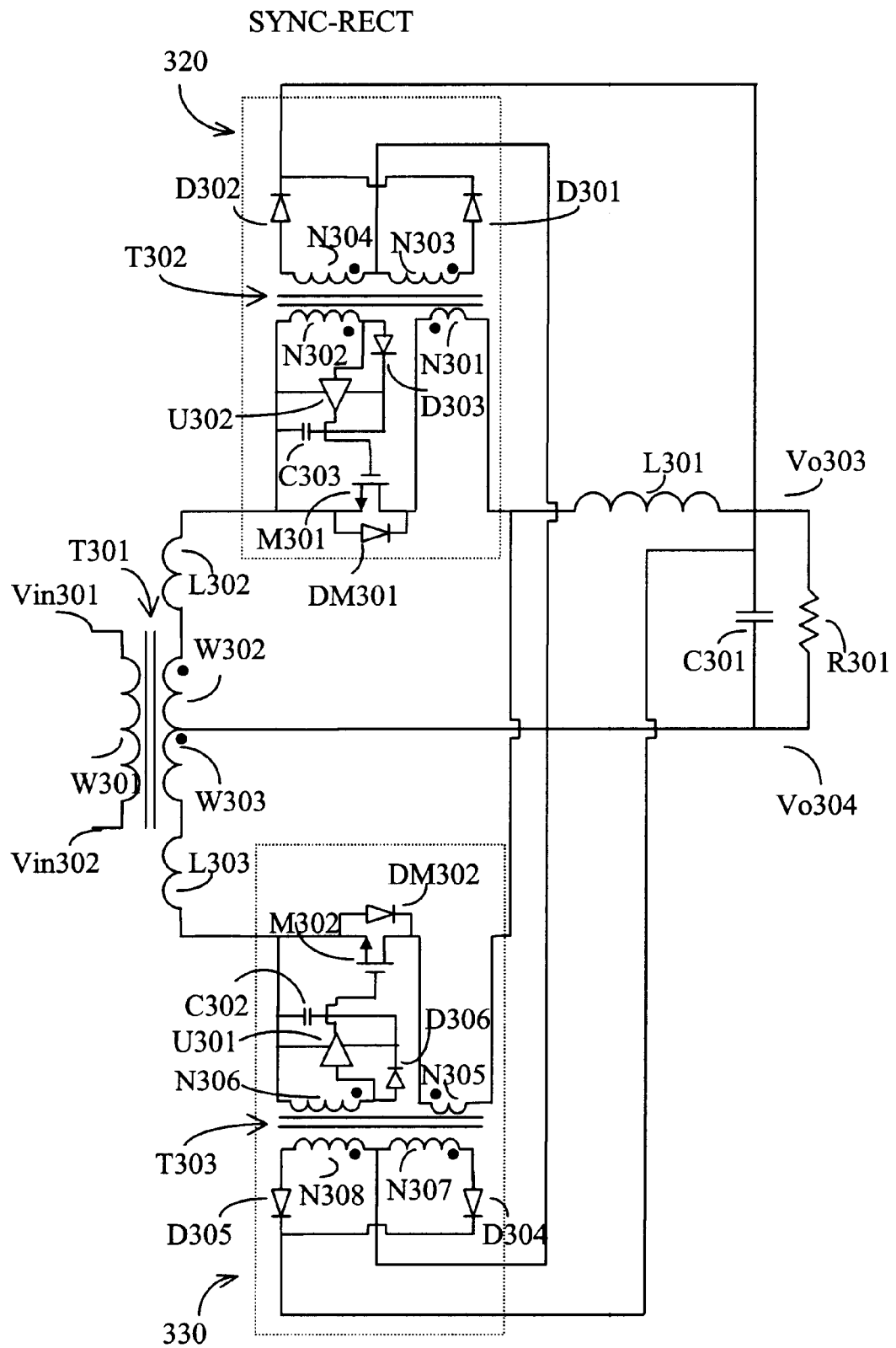
FIG. 6 is a second practical implementation of the present invention.

FIG. 6 shows another embodiment in the context of an isolated forward converter with center-tapped full-wave rectification. It comprises transformer T301, the main output transformer of a forward converter that includes primary winding W301, first secondary-winding W302 and its equivalent leakage inductance L302, and second secondary-winding W303 and its equivalent leakage inductance L303. One terminal of first secondary-winding W302 is coupled to synchronous rectifier unit 320 comprising components described in FIG. 2 (or, alternatively FIG. 4). One terminal of second secondary-winding W303 is coupled to another synchronous rectifier unit 330 that is, in turn, coupled to synchronous rectifier unit 320. These two synchronous rectifier units are coupled to filter inductor L301 coupled to filter capacitor C301. One terminal of capacitor C301 is coupled to the center-tapped secondary-windings of transformer T301. Output terminal Vo303 is coupled to capacitor C301 and inductor L301, while another output terminal Vo304 is coupled to another terminal of capacitor C301 and the center tap of the secondary-windings. The synchronous rectifiers have MOSFETs M301 and M302 as their main switching devices. Terminals for connection to a voltage source in the two synchronous rectifier units are connected to output terminals Vo303 and Vo304 respectively.

The operation of this embodiment is described herein. An AC voltage is applied to primary winding W301 and a corresponding AC voltage is induced across secondary-windings W302 and W303. When secondary-winding W302 exhibits a positive cycle, secondary-winding W303 exhibits a negative cycle and reverse biases body diode DM302. Consequently, there is no current flowing through current sense winding N305 and MOSFET M302 is OFF. At the same time body diode DM301 is forward biased and current flows through current sense winding N301. MOSFET M301 is turned ON with current flowing through this low loss device. Similarly, when secondary-winding W303 exhibits a positive cycle, secondary-winding W302 exhibits a positive cycle and reverse biases body diode DM301. Similarly, no current flows through current sense winding N301 and MOSFET M301 turns OFF. On the other hand, body diode DM302 is forward biased and current flows through current sense winding N305 resulting in MOSFET M302 turning on and current flowing through this low loss device. As a result, both positive and negative cycles are rectified as a positive voltage that is then filtered and a steady DC source produced at the output terminals.

Although, the voltage across the transformer primary winding may become zero in a switching cycle, the synchronous rectifier units can still function as low loss switches. Under this condition, the current flowing in inductor L301 is shared by two paths, one through MOSFET M301 and secondary-winding W302, and another one through MOSFET M302 and secondary-winding W303. Both MOSFETs are turned ON as they are current driven and conduct current in a low loss manner.

As noted previously, operation is independent of input AC voltage on the transformer primary side because the design is current driven and not dependent on input voltage. This enables a power converter to operate with high efficiency over a wide input voltage range- a significant advantage.

Figure 7:
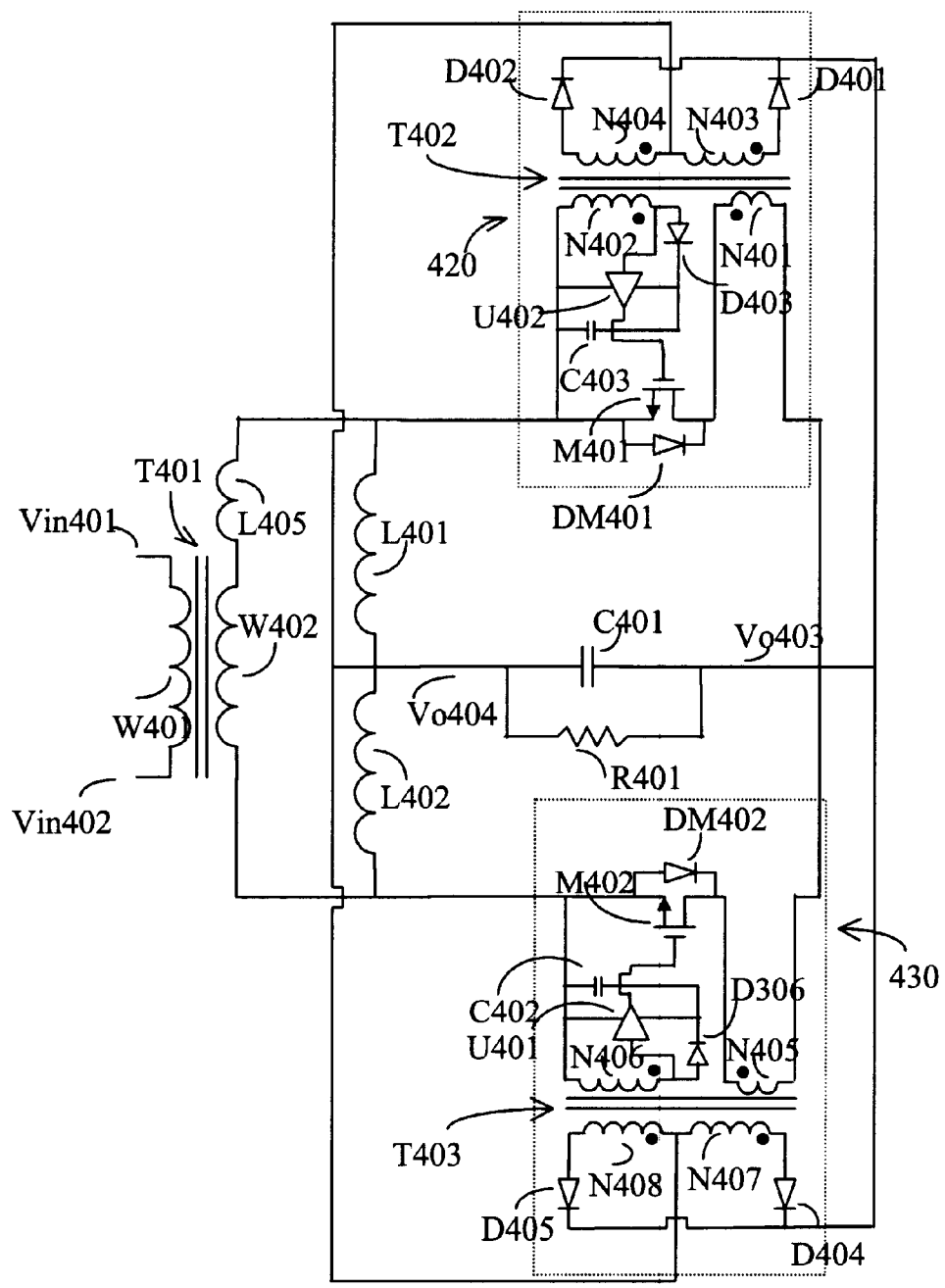
FIG. 7 is a third practical implementation of the present invention.

FIG. 7 shows another embodiment in the context of an isolated current doubler type forward converter. It comprises a transformer T401 that is the main output transformer of a forward converter that includes primary winding W401, secondary-winding W402 and its equivalent leakage inductance L405. One terminal of secondary-winding W402 is coupled to synchronous rectifier unit 420. This synchronous rectifier unit comprises all components described in the basic embodiment. The coupling point of the transformer secondary is further coupled to inductor L401. Another terminal of the secondary-winding W402 has a symmetrical arrangement. It is coupled to another synchronous rectifier unit 430 that comprises all components described in the basic embodiment. This terminal is further coupled to inductor L402. This inductor is coupled to inductor L401 with output terminal Vo404. One terminal of synchronous rectifier 420 attached to winding N401 is coupled to a terminal of synchronous rectifier 430 attached to winding N405. Output terminal Vo403 is coupled to this node and output capacitor C401 is coupled to terminals Vo403 and Vo404. These output terminals are further coupled to load resistor R401. Terminals for connection to a voltage source in the two synchronous rectifier units are connected to output terminals Vo403 and Vo404 respectively.

It should be noted that the synchronous rectifier unit may have the configuration depicted in FIG. 2 or 4.

The operation of this embodiment is described next. An AC voltage is applied to primary winding W401 and a corresponding AC voltage is induced across secondary-winding W402. When secondary-winding W402 exhibits a positive cycle, body diode DM401 is turned on. Current flowing through winding N401 and turns on low loss MOSFET M401. Current flows through MOSFET M401 and on to output load resistor R401. Since diode DM402 is reversed biased, no current flows through MOSFET M402. The load current is shared by currents in inductors L401 and L402. When secondary-winding W402 exhibits a negative cycle, body diode DM402 is turned ON. Current flowing through winding N405 turns ON low loss MOSFET M402. Diode DM401 is reverse biased and MOSFET M401 is turned OFF. Note that this circuit arrangement enables power to be delivered to the load attached to the output terminals in both positive and negative cycles with filtering by capacitor C401 and inductors L401 and L402. The output voltage is positive at terminal Vo403 and negative at Vo404.

Although, the voltage across the transformer primary winding may become zero in a switching cycle, the synchronous rectifier units can still function as low loss switches. Since the synchronous rectifier units are current driven as long as sufficient current flow through the switches M401 or M402, they will be turned ON. Their operations are not impaired by the secondary voltage of the transformer dropping to zero or the presence of transformer leakage inductance L405.

Figure 8:
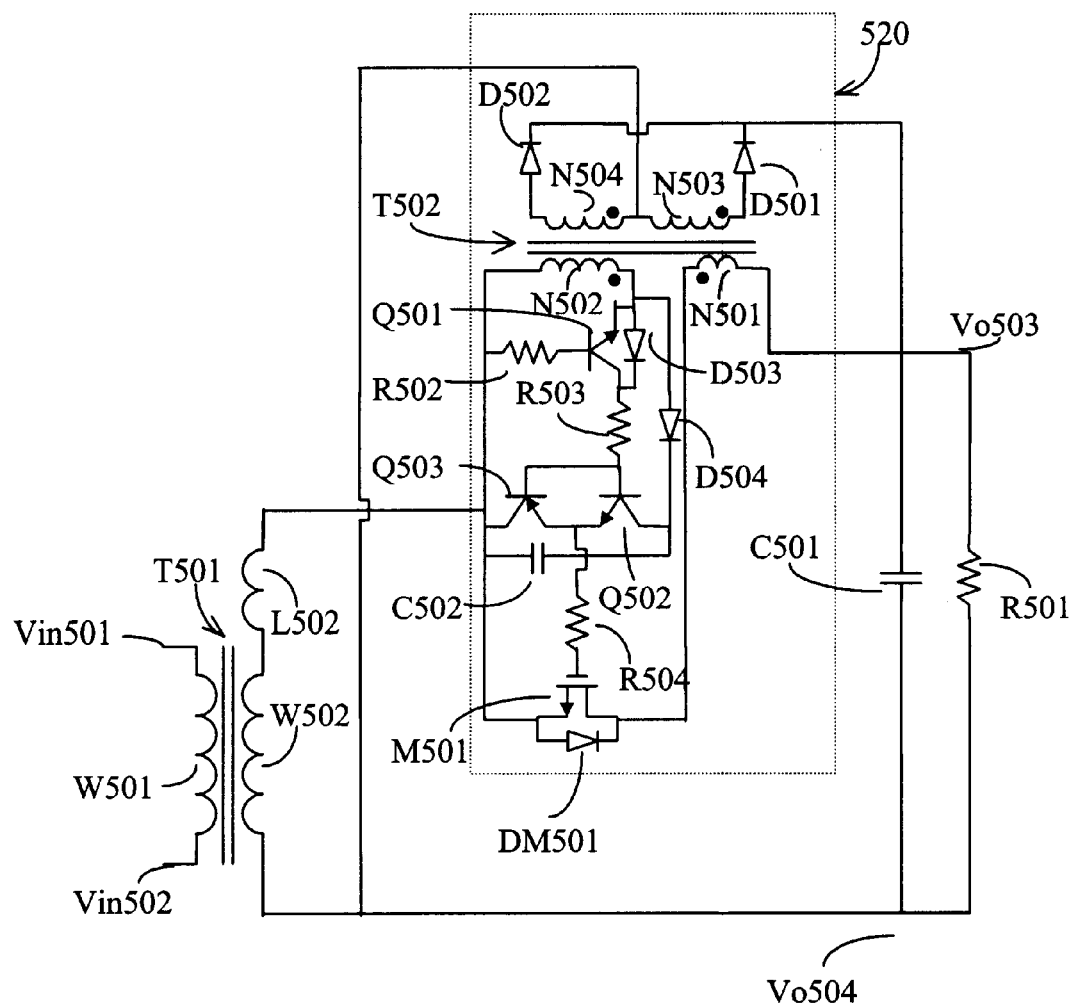
FIG. 8 is a fourth practical implementation of the present invention.

FIG. 8 shows another embodiment in the context of a flyback type converter. Illustrated is a coupled inductor T501 including primary winding W501, secondary-winding W502 and its equivalent leakage inductance L502. One terminal of secondary-winding W502 is coupled to synchronous rectifier unit 520 that is further coupled to output capacitor C501. Output terminals VoSO3 and Vo504 are coupled to the positive and negative terminals of capacitor C501 respectively. These terminals produce a DC output for connection to load R501. Negative terminal Vo504 is coupled to secondary-winding W502. The synchronous rectifier unit 520 has its terminals for connection to a voltage source connected to output terminals Vo503 and Vo504. The hysterisis buffer in this embodiment is realized by diodes D503 and D504, transistors Q501, Q502 and Q503 and resistors R502, R503 and R504. Naturally, other designs for hysterisis buffer circuit with suitable driving capability may be used in the synchronous rectifier unit to enhance gate drive signal for its MOSFET. It should be noted that, among other designs, the synchronous rectifier unit may have the configurations shown in FIG. 2 or 4.

The operation of this embodiment is described next. An AC voltage is applied to primary winding W501 and a corresponding AC voltage is induced across secondary-winding W502. Windings W501 and W502 are arranged so that they produced voltage of opposite phase. When secondary-winding W502 exhibits a positive cycle, body diode DM501 is turned on. Current flows through winding N501 and induces a positive voltage across N502. When this induced positive voltage goes higher than the forward drop of D503 (~0.6V) plus the base to emitter forward bias voltage of Q502 (~0.6V), Q502 will be driven on to turn on a low loss MOSFET M501 through R504. This means the upper threshold of this hysterisis buffer is approximately equal to 1.2V. Current then flows through low loss channel of MOSFET M501 and delivers current to output load resistor R501. When secondary-winding W502 exhibits a negative cycle, current flowing in winding N501 during the positive cycle will fall with falling rate proportional to the negative voltage across W502 and inversely proportional to the leakage inductance L502. When this current falls to zero, a negative voltage will be induced across N502 because of the stored magnetizing energy of T502 during the positive cycle. When this negative voltage falls to a negative value (~–0.6V) so that the base to emitter junction of Q501 is forward biased, Q501 will then be turned on and hence turn on the transistor Q503 to discharge the gate voltage of M501. This means the lower threshold of this implemented hysterisis buffer is approximately equal to –0.6V. M501 will then be turned off to cease current flow in opposite direction to that in a positive cycle. Similar to operations in other embodiments the synchronous rectifier provides energy recovery for high efficiency operations.

The present invention was subjected to experimental evaluation in a forward converter based design. Two experiments were carried out. In one experiment the secondary section of the forward converter comprised of Schottky diode of type MBR1645, which is a 16A, 45V device. In another experiment the secondary section comprised of the present invention as synchronous rectification units. The switching devices in the synchronous rectification units are MOSFET of type SGS60NE03L-10 having a turn on resistance of 10 milli-ohm. The converter operates under the same condition with a load current of 4 A. In both cases the temperature rise of the devices was recorded. The temperature rise for the Schottky diode was 27 degree C. whereas the temperature rise for the MOSFET was only 6 degree C. These two types of devices have the same package type TO220. This experiment verified the effectiveness of the present invention in reducing losses and increasing the efficiency.

While the invention has been described in connection with what is presently considered to be the most practical and preferred embodiments, it is to be understood that the present invention is not limited to the disclosed embodiments and is expressly intended to cover various modifications and equivalent arrangements included within the scope of the appended claims.

Thus, it will be appreciated that the various features described herein may be used singly or in any combination thereof. Thus, the present invention is not limited to only the embodiments specifically described herein. While the foregoing description and drawings represent an embodiment of the present invention, it will be understood that various additions, modifications, and substitutions may be made therein without departing from the spirit and scope of the present invention as defined in the accompanying claims. In particular, it will be clear to those skilled in the art that the present invention may be embodied in other specific forms, structures, and arrangements, and with other elements, and components, without departing from the spirit or essential characteristics thereof. One skilled in the art will appreciate that the invention may be used with many modifications of structure, arrangement, and components and otherwise, used in the practice of the invention, which are particularly adapted to specific environments and operative requirements without departing from the principles of the present invention. The presently disclosed embodiment is therefore to be considered in all respects as illustrative and not restrictive, the scope of the invention being indicated by the appended claims, and not limited to the foregoing description.

What is claimed is:

1. A rectifier apparatus for rectifying current in a selected branch of a circuit, comprising:

a pair of terminals for connection to an external voltage source;

a power switch with at least three terminals wherein at least one of the three terminals is a control terminal that upon receiving an appropriate voltage turns the power switch turns ON;

a hysteresis driver coupled to the control terminal of the power switch, the driver having a pair of input terminals for receiving a voltage signal that upon equaling a first preset voltage level causes the driver to produce the appropriate voltage to turn ON the power switch via the control terminal and then upon the voltage signal falling below a second preset voltage level the driver producing less than the appropriate voltage to turn OFF the power switch;

a transformer having a plurality of windings;

a first winding from the plurality of windings coupled at one of its terminals to the power switch whereby providing current for rectification;

a second winding from the plurality of windings coupled to the pair of input terminals of the driver;

a magnetic coupling between the first winding from the plurality of windings and the second winding from the plurality of windings such that current flowing through the first winding induces a voltage signal at the second winding;

a third winding of the transformer coupling to the pair of terminals for connection to the external voltage source via at least one rectifier such that energy may be delivered to the external voltage source when the power switch is turned ON; and limiting magnetic means to couple the windings such that voltage established on the second winding is limited by coupling to the voltage source through other windings.

2. The rectifier apparatus of claim 1 wherein the third winding is coupled to the pair of terminals that are connected to the external voltage source via only one rectifier.

3. The rectifier apparatus of claim 2 wherein magnetic reset energy is delivered to the external voltage source when the power switch is turned OFF.

4. The rectifier apparatus of claim 1 having furthermore a fourth winding of the transformer coupling to the output terminals through a second rectifier such that energy may be delivered to the external voltage source when the power switch is turned OFF.

5. The rectifier apparatus of claim 1 connected furthermore to function as a component in a power converter.

6. The rectifier apparatus of claim 5 wherein the power converter is a forward type power converter.

7. The rectifier apparatus of claim 6 wherein the power converter has a center tapped secondary-winding.

8. The rectifier apparatus of claim 6 wherein the power converter is a current doubler type forward converter.

9. The rectifier apparatus of claim 6 wherein the power converter is a flyback type converter.

10. A method of improving a synchronous rectifier based rectifier apparatus, the method comprising the steps of:

triggering a control terminal of the synchronous rectifier with a hysteresis driver that generates a voltage signal supplied to the control terminal in response to receiving a sample input voltage;

setting a first preset voltage level of the hysteresis driver to correspond to a sample voltage associated with a positive flow of a current to be rectified via the synchronous rectifier whereby the hysteresis driver generates the voltage signal turning ON the synchronous rectifier when the sample voltage exceeds the first preset voltage level;

setting a second preset voltage level of the hysteresis driver to correspond to a sample voltage associated with a reduction of a current to be rectified via the synchronous rectifier whereby the hysteresis driver generates the voltage signal turning OFF the synchronous rectifier from an ON state when the sample voltage falls below the second preset voltage level; and connecting the hysteresis driver to receive the sample voltage responsive to flow of a current to be rectified from an external power source.

11. The method of claim 10 wherein the hysteresis driver receives power from the external power source.

12. The method of claim 10 wherein the hysteresis driver receives power from an independent power source.

* * * * *